(12) United States Patent
El-Mahdy et al.

(10) Patent No.: US 9,020,257 B2
(45) Date of Patent: Apr. 28, 2015

(54) TRANSFORMING A DIGITAL IMAGE FROM A LOW DYNAMIC RANGE (LDR) IMAGE TO A HIGH DYNAMIC RANGE (HDR) IMAGE

(75) Inventors: Ahmed H. El-Mahdy, Alexandria (EG); Hisham E. El-Shishiny, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 13/500,926

(22) PCT Filed: Jul. 12, 2010

(86) PCT No.: PCT/EP2010/059950
§ 371 (c)(1),
(2), (4) Date: Apr. 9, 2012

(87) PCT Pub. No.: WO2011/042229
PCT Pub. Date: Apr. 14, 2011

(65) Prior Publication Data
US 2012/0201456 A1  Aug. 9, 2012

(30) Foreign Application Priority Data
Oct. 8, 2009  (EP) .................................. 09172538

(51) Int. Cl.
*G06K 9/32* (2006.01)
*H04N 5/235* (2006.01)
(Continued)

(52) U.S. Cl.
CPC ............. *H04N 5/2351* (2013.01); *G06T 5/009* (2013.01); *G06T 2200/21* (2013.01); *G06T 2207/20208* (2013.01); *H04N 5/20* (2013.01);
(Continued)

(58) Field of Classification Search
CPC ................... H04N 5/2355; G06T 2207/20221; G06T 5/008
See application file for complete search history.

(56) References Cited

U.S. PATENT DOCUMENTS 5,828,793 A * 10/1998 Mann ............................ 382/284
6,650,774 B1   11/2003 Szeliski
(Continued)

FOREIGN PATENT DOCUMENTS

CN           1577396 A    2/2005
CN         102696220 A    9/2012
(Continued)

OTHER PUBLICATIONS

S'A, Asla M. et al., "High Dynamic Range Imaging Reconstruction," Morgan & Claypool Publishers, DOI:10.2200/S00103ED1V01Y200711CGR0032007, 2008, 72 pgs.
(Continued)

*Primary Examiner* — Tsung-Yin Tsai
(74) *Attorney, Agent, or Firm* — Cuenot, Forsythe & Kim, LLC

(57) ABSTRACT

The invention provides a method for transforming an image from a Low Dynamic Range (LDR) image obtained with a given camera to a High Dynamic Range (HDR) image, the method comprising:
  obtaining the exposure-pixel response curve (21) for said given camera
  converting the LDR image to HSB color space arrays (22), said HSB color space arrays including a Hue array, a Saturation array and a Brightness array; and
  determining a Radiance array (23, 24) by inverse mapping each pixel in said Brightness array using the inverse of the exposure-pixel response curve (f−1).

20 Claims, 8 Drawing Sheets

(51) Int. Cl.
   G06T 5/00      (2006.01)
   H04N 5/20      (2006.01)
   H04N 5/232     (2006.01)
   H04N 9/67      (2006.01)
   H04N 19/14     (2014.01)

(52) U.S. Cl.
   CPC ........ *H04N 5/23229* (2013.01); *H04N 5/2355* (2013.01); *H04N 9/67* (2013.01); *H04N 19/14* (2013.01)

(56) References Cited

U.S. PATENT DOCUMENTS

| | | | |
|---|---|---|---|
| 6,687,400 B1 | 2/2004 | Szeliski | |
| 7,298,402 B2* | 11/2007 | Horiuchi | 348/229.1 |
| 7,426,312 B2 | 9/2008 | Dance et al. | |
| 7,430,011 B2* | 9/2008 | Xu et al. | 348/362 |
| 7,443,533 B2* | 10/2008 | Lin | 358/1.6 |
| 8,289,412 B2 | 10/2012 | Banterle et al. | |
| 2003/0103670 A1 | 6/2003 | Schoelkopf et al. | |
| 2004/0239798 A1 | 12/2004 | Nayar et al. | |
| 2005/0013501 A1 | 1/2005 | Kang et al. | |
| 2005/0243176 A1* | 11/2005 | Wu et al. | 348/207.1 |
| 2006/0061845 A1* | 3/2006 | Lin | 358/540 |
| 2006/0215882 A1 | 9/2006 | Ando et al. | |
| 2008/0094486 A1* | 4/2008 | Fuh et al. | 348/229.1 |
| 2008/0297597 A1* | 12/2008 | Inomata et al. | 348/80 |
| 2009/0046947 A1 | 2/2009 | Kobayashi | |
| 2010/0271512 A1* | 10/2010 | Garten | 348/239 |

FOREIGN PATENT DOCUMENTS

| | | | |
|---|---|---|---|
| DE | 112010003988 T5 | 1/2013 | |
| GB | 2486348 A | 6/2012 | |
| JP | 2006268135 A | 10/2006 | |
| JP | 2007020176 A | 1/2007 | |
| JP | 2009049547 A | 3/2009 | |
| JP | 2013507674 A | 3/2013 | |
| TW | 201138481 A | 11/2011 | |
| WO | 2008066840 A1 | 6/2008 | |
| WO | 2011042229 A1 | 4/2011 | |

OTHER PUBLICATIONS

Barakat, N. et al., "The Tradeoff Between SNR and Exposure-set Size in HDR Imaging," 15th IEEE Int'l Conf. on Image Processing, Oct. 12-15, 2008, pp. 1848-1851.

PCT/EP2010/059950 International Search Report, Sep. 10, 2010.

Debevec, P.E., et al., "Recovering High Dynamic Range Radiance Maps from Photographs," [online] Computer Graphics Proc., SIGGRAPH 97, Aug. 3-8, 1997, pp. 369-378, retrieved from the Internet: <citeseerx.ist.psu.edu/viewdoc/summary?doi=10.1.1.27.1509Cached-Similar> 10 pg.

Kwon, J.H., et al., "Exposure-Adaptive Color-Image Enhancement," [online] In Proc. SPIE, vol. 7250, Jan. 19, 2009, retrieved from the Internet: <http://144.206.159.178/ft/CONF/16427907/16427934.pdf>.

Rempel, A.G., et al., "Ldr2Hdr: On-the-fly Reverse Tone Mapping of Legacy Video and Photographs," [online] ACM SIGGRAPH 2007 Papers, Aug. 5-9, 2007, retrieved from the Internet: <http://www.cs.ubc.ca/nest/imager/tr/2007/Rempel_Ldr2Hdr/paper07/Ldr2Hdr/main.pdf>, 6 pgs.

Banterle, F., et al., "Inverse Tone Mapping," [online] Proc. of 4th Int'l. Conf. on Computer Graphics and Interactive Rtechniques in Australasia and Southeast Asia, GRAPHITE '06, Nov. 29-Dec. 2, 2006, retrieved from the Internet: <http://www.banterle.com/francesco/publications/download/graphite2006.pdf>, 9 pg.

Reinhard, E., et al., "Photographic Tone Reproduction for Digital Images," [online] ACM Trans. Graph. 21, 3 (Jul. 2002) pp. 267-276, retrieved from the Internet: <http://www.cs.utah.edu/~reinhard/cdrom/tonemap.pdf>, 10 pg.

Aydin, T.O., et al., "Dynamic Range Independent Image Quality Assessment," [online] ACM SIGGRAPH 2008 Papers (Aug. 11-15, 2008) SIGGRAPH '08, ACM, retrieved from the Internet: <http://www.mpi-inf.mpg.de/resources/hdr/vis_metric/aydin_sg08.pdf>, 10 pg.

Debevec, P., "A Median Cut Algorithm for Light Probe Sampling," [online] ACM SIGGRAPH 2006 Courses, Jul. 30-Aug. 3, 2006, SIGGRAPH '06, retrieved from the Internet: <http://gl.ict.usc.edu/Research/MedianCut/MedianCutSampling.pdf>, 1 pg.

Reinhard, E. et al., "Photographic tone reproduction for digital images", ACM Transactions on Graphics (TOG)—Proceedings of ACM SIGGRAPH 2002, US 2002, vol. 21 Issue 3, p. 267-276.

* cited by examiner

| Comparison | Blue | Green |
|---|---|---|
| A. Gen-LDR vs. Input-LDR | 47.2% | 0.0% |
| B. Gen-HDR vs. Real-HDR | 77.4% | 0.0% |
| C. Gen-HDR-Rad vs. Real-HDR | 40.0% | 0.1% |

TRANSFORMING A DIGITAL IMAGE FROM A LOW DYNAMIC RANGE (LDR) IMAGE TO A HIGH DYNAMIC RANGE (HDR) IMAGE

CROSS-REFERENCE TO RELATED APPLICATIONS

This application is a national stage of PCT/EP2010/059950 filed Jul. 12, 2010, designating, inter alia, the United States and claiming priority to European Patent Application No. 09172538.2 filed Oct. 8, 2009, each of which is hereby incorporated by reference in their entirety.

FIELD OF THE INVENTION

The present invention generally relates to image processing and more specifically to a method and system for transforming a digital image from a Low Dynamic Range (LDR) image to a High Dynamic Range (HDR) image.

BACKGROUND OF THE INVENTION

An emerging technology in the field of digital photography is High Dynamic Range Imaging (HDRI). HDRI provides for capturing most of actual world luminance, making it possible to reproduce a picture as close as possible to reality when using appropriate displays. High dynamic range imaging thus provides a representation of scenes with values commensurating with real-world light levels. The real world produces a twelve order of magnitude range of light intensity variation, which is much greater than the three orders of magnitude common in current digital imaging. The range of values that each pixel can currently represent in a digital image is typically 256 values per color channel (with a maximum of 65536 values), which is not suitable for representing many scenes. With HDR images, scenes can be captured with a range of light intensities representative of the scene and range of values matched to the limits of human vision, rather than matched to any display device. Images suitable for display with current display technology are called Low Dynamic Range (LDR) images. The visual quality of high dynamic range images is much better than that of conventional low dynamic range images. HDR images are different from LDR images regarding the capture, storage, processing, and display of such images, and are rapidly gaining wide acceptance in photography.

As use of HDRI spreads in the field of digital photography, there is a growing need for HDRI displays capable of displaying both still images and videos. This represents a significant shift in display quality over traditional displays. However, since the existing media is not of High Dynamic Range (HDR), the utility of HDRI displays is limited to newly acquired HDR images using HDRI sensors. Existing solutions to convert existing Low Dynamic Range (LDR) images into equivalent HDR images is commonly known as "reverse tone mapping". Reverse tone mapping generally requires two phases. A first phase is performed to inverse map the luminance of an input LDR image into an expanded HDR luminance (also called HDR radiance). Due to image quantization, this phase results in loss of details and introduces noise in the region of high luminance. The second phase remediates to this defect by smoothing such regions while also allowing for potentially further increasing the dynamic range.

One known solution to perform the first phase is the approach taken in the article by Rempel A. G., Trentacoste M., Seetzen H., Young H. D., Heidrich W., Whitehead L., and Ward G., entitled "Ldr2Hdr: on-the-fly reverse tone mapping of legacy video and photographs", ACM SIGGRAPH 2007 Papers (San Diego, Calif., Aug. 5-9, 2007). This approach relies on a fast inverse method that is suitable for real-time video processing. According to this approach, inverse gamma mapping is performed and then the dynamic range is extended to 5000. Further, smooth filters are performed to decrease the effect of quantization.

Another solution to perform the first phase of reverse tone mapping is described in the article entitled "Inverse tone mapping", Proceedings of the 4th international Conference on Computer Graphics and interactive Techniques in Australasia and Southeast Asia (Kuala Lumpur, Malaysia, Nov. 29-Dec. 2, 2006), GRAPHITE '06, ACM, New York, N.Y., 349-356 by Banterle F., Ledda P., Debattista K., and Chalmers A. This solution uses an inverse mapping function that is based on a global tone mapping operator, previously described by Reinhard E., Stark M., Shirley P., and Ferwerda J., in an article entitled "Photographic tone reproduction for digital images", ACM Trans. Graph. 21, 3 (July 2002), 267-276. Inverse values are then obtained by solving quadratic equation, generating thereby a considerably larger dynamic range and shrink the range selectively at certain pixels. However, these existing solutions provide an inverse tone mapping function for the first phase that is not accurate enough. The obtained radiance does not exactly match with real-world radiance due to the "generic" inverse mapping function. That roughly approximates real-world radiance values.

There exist two different approaches to perform the second phase of reverse tone mapping. The first approach described by Rempel et al, in the article entitled "Ldr2Hdr: on-the-fly reverse tone mapping of legacy video and photographs", ACM SIGGRAPH 2007 Papers (San Diego, Calif., Aug. 5-9, 2007), generates a Gaussian mask over pixels surpassing a high value. Moreover, this approach uses an 'Edge-stopping' function to improve local contrasts at edges. The resultant brightness function is used to extend lighting considerably. A more complex technique is the one described in Banterle et al., "Inverse tone mapping", Proceedings of the 4th international Conference on Computer Graphics and interactive Techniques in Australasia and Southeast Asia (Kuala Lumpur, Malaysia, Nov. 29-Dec. 2, 2006), GRAPHITE '06, ACM, New York, N.Y., 349-356. This second approach includes the segmentation of the input image with regions of equal light intensities, using a median cut algorithm (Debevec P., "A median cut algorithm for light probe sampling", in ACM SIGGRAPH 2006 Courses (Boston, Mass., Jul. 30-Aug. 3, 2006), SIGGRAPH '06, ACM, New York, N.Y., 6). The centriods of those regions are used to estimate light densities and to construct an "expand" map. The map is then used to generate the final HDR image by guiding an interpolation operation between the input LDR and the inverse mapped LDR image. These solutions for the second phase of the reverse tone mapping rely on finding pixels with high luminance values and use that to expand the dynamic range of those pixels. However, such extrapolation only happens to extend the luminance of the hotspots (highlights) and nearby regions, and never decrease the luminance in dark regions (shades). Accordingly, they effectively perform one-sided dynamic range extension using local operation (the shades are globally expanded), thereby affecting the quality of shaded regions in the resultant HDR image.

SUMMARY OF THE INVENTION

A method for transforming a digital image from a Low Dynamic Range (LDR) image obtained with a given camera to a High Dynamic Range (HDR) image is disclosed. An exposure-pixel response curve is obtained for the given camera. The LDR image is converted to hue, saturation, and brightness (HSB) color space arrays including a hue array, a saturation array, and a brightness array. A radiance array is generated by inverse mapping each pixel in the brightness array using an inverse of the exposure-pixel response curve. For each pixel in the radiance array a local luminance average is determined. An adjusted radiance array is generated by adjusting each pixel of the radiance array with the local luminance average for the pixel. The LDR image is converted, using the hue array, the saturation array, and the adjusted radiance array, into the HDR image. A computer hardware system including a processor configured to perform the method is disclosed. Additionally, a computer program product including a computer usable storage medium having stored therein computer usable program code for performing the method is also disclosed.

BRIEF DESCRIPTION OF THE DRAWINGS

Embodiments of the present invention will now be described by way of example with reference to the accompanying drawings in which like references denote similar elements, and in which.

The drawings are intended to depict only typical embodiments of the invention, and therefore should not be considered as limiting the scope of the invention.

DETAILED DESCRIPTION

In general, an improved reverse tone mapping for transforming an LDR image into an HDR image is provided. The camera response curve is used to reconstruct the radiance map of the image, instead of performing inverse gamma or standard fixed inverse function as provided in the prior art solutions.

Certain aspects rely upon dodging and burning operations to selectively increase the luminance or decrease the luminance of an image, respectively. A dodging and burning like operation is applied in the HDR domain to extend the dynamic range of an image. This also generally expands the local contrast allowing for more visible details that are not visible in the LDR image. Moreover, applying a dodging and burning like operation in the HDR domain allows for performing smoothing, thereby decreasing the quantization effects.

Advantages include but are not limited to the following: (i) a simplified technique to perform recovering of HDR values from a single LDR image, which is easier than reconstructing images from a sequence of differently exposed images; (ii) expansion of the dynamic range from both tails of the luminance channel (high and low parts), whereas prior solutions expand the high part; (iii) increased level of details visible across the middle/shades parts of the image; (iv) more realistic radiance map of the image using camera response curve; (v) improved atheistic quality of the resultant image using a tested photographic technique; (vi) a new HDR display can be used for viewing existing LDR images for important applications, such as medical imaging; (vii) improved quality of LDR cameras output by using the reverse tone mapping to generate a higher quality HDR image that could be forward tone mapped back into LDR, achieving significant improvement in contrast visible; (viii) easier detection of edges for further image processing operations; and (ix) applicability as an enhancement operation to digital images where further image processing operates better in HDR domains, such as for an edge detection operation in the field of medical imaging.

The present invention provides a reverse tone mapping method and system for transforming a digital image from a Low Dynamic Range (LDR) image to a High Dynamic Range (HDR) image. The reverse tone mapping solution according to the invention is suitable for processors of any type that can be used for performing digital computations and associated logic.

Figure 1:
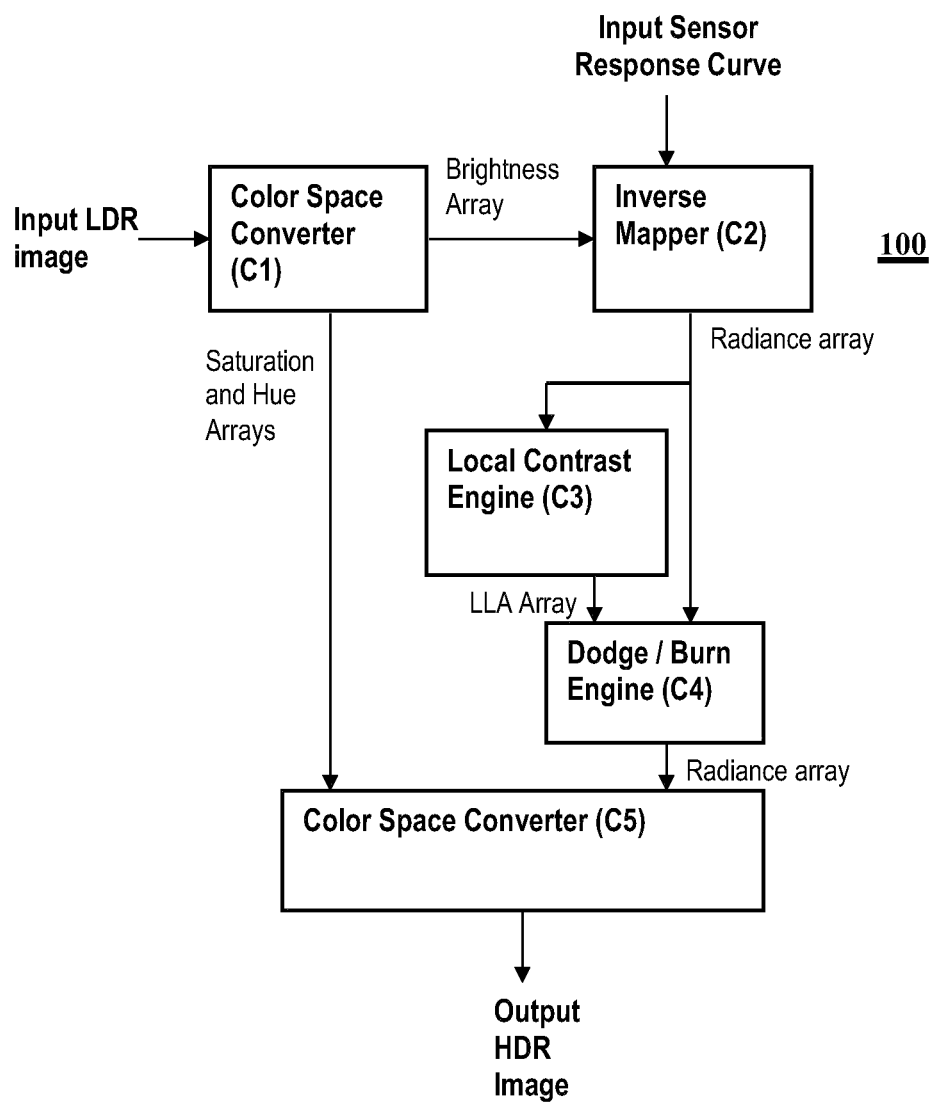
FIG. 1 is a system block diagram for generating a High Dynamic Range (HDR) image from a Low Dynamic Range (LDR) image, in accordance with embodiments of the present invention.

FIG. 1 shows a system 100 for generating an HDR image from an input LDR image. FIG. 1 shows data flow among system components, wherein each component is labeled by a name that starts with the character "C" and followed by a number. The system components will be referred to infra, through use of the notation C1, C2 . . . , C5. The system operates by first inputting an LDR image and feeding it into the Color Space Converter C1 where the image is converted into Hue, Saturation, and Brightness color space (HSB), generating three corresponding arrays. The brightness array and camera sensor response curve are fed into the Inverse Mapper C2. The mapper then uses the supplied response curve to inverse map the brightness array into radiance array. The Local Contrast Engine C3 calculates local contrast for the radiance array generating a Local Luminance Average (LLA) array. The Dodge/Burn Engine C4 uses LLA array to dodge/burn Radiance Array, generating an extended Radiance array.

The generated array with the saturation and hue arrays are then fed into the Color Space Converter C5, where the image is converted into the original input LDR color space (for example RGB), generating the output HDR image.

To perform reverse tone mapping on a LDR image, during a first phase, the luminance of an input LDR image is inverse mapped into an expanded HDR luminance. This initial step involves loss of details and introduces noise in the region of high luminance, which is remediated during a second phase that smoothes these regions.

In accordance with the embodiments of the present invention, the first phase of the reverse tone mapping is performed using the information of the capturing sensor/device. Sensor identification is readily available in most images captured with digital cameras, as well as film camera. This first phase constructs an initial radiance map by inverse tone mapping of the input image using the camera response curve.

Figure 2:
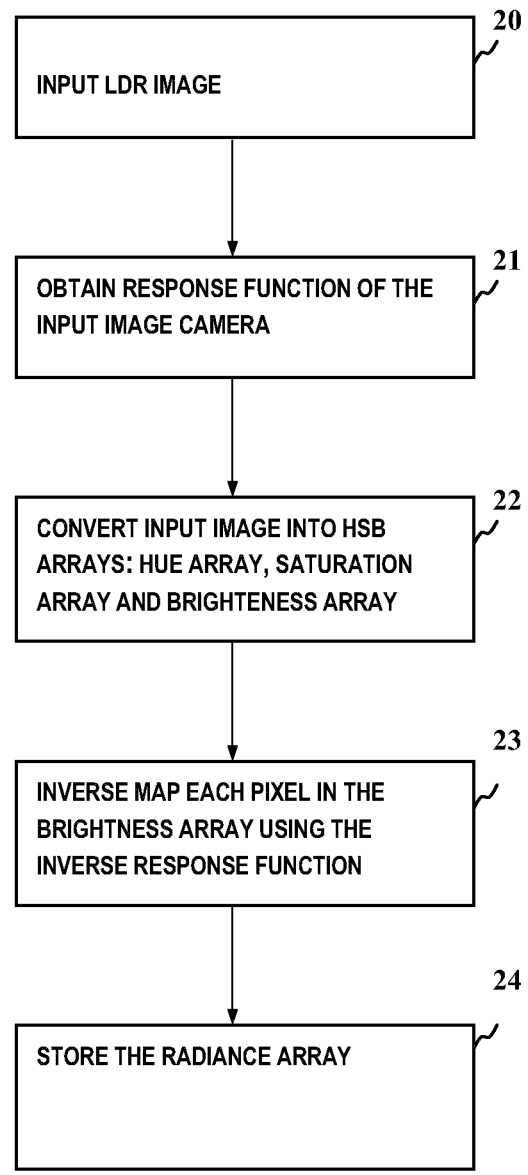
FIG. 2 is a high-level flow chart describing generation of a High Dynamic Range (HDR) image from a Low Dynamic Range (LDR) image, in accordance with embodiments of the present invention.

FIG. 2 shows a high level flowchart describing this first phase of the reverse tone mapping, in accordance with embodiments of the present invention.

Step 20 initially inputs an LDR image and then stores the LDR image in memory. Such an LDR image could be represented in a variety of color spaces. A standard color space is the RGB space in which the color of each pixel is represented by three components, namely Red (R), Green (G), and Blue (B). Another color space is Luv, wherein L is the luminance component, and u and v are each a chrominance component. Reverse tone mapping operates on the luminance channel.

Step 21 obtains the exposure-pixel response curve for the given camera. The exposure-pixel response curve is intrinsic for each camera and could be obtained directly from sensor datasheets. Alternatively, the exposure-pixel response curve may be determined by analysing a sequence of differently exposed images for a same scene. The exposure response curve can be measured, calculated, estimated, or even received from a remote site. The curve is substantially constant per camera, and thus there is no need to repeat reconstruction of the response function for further images generated by the same camera. In the following description, the exposure-pixel response curve will be referred to as function "f(x)", where x designates a given exposure value. y=f(x) will then represents the pixel luminance value for the given exposure x. The exposure-pixel response curve provides real-world radiance values for the pictures. These values are more accurate than those obtained using the simple inverse gamma methods of the prior art.

In step 22, the LDR input image is converted into HSB colour space arrays, where H represents the Hue, S represents the Saturation and B represents the Brightness. HSB (also known as HSL representation) is a representation of points in an RGB color model that describes perceptual color relationships more accurately than RGB. In the following description, the hue array will be represented by "Hue[ ]", the saturation array will be represented by "Saturation[ ]", and the brightness array by "Brightness[ ]".

In step 23, for each pixel in the brightness array (Brightness[ ] array), its value is inverse mapped using the response curve and the obtained exposure is stored into Radiance[i]. Using the notation "f$^{-1}$(y)" to designate the inverse of the exposure-pixel response function f(x), then for an input pixel value y, f$^{-1}$(y) returns the exposure value x. Accordingly, the radiance for a channel iterator i is defined as follows:

Radiance[i]=f$^{-1}$(Brightness[i]), where Radiance[ ] array is the obtained radiance map.

In step 24, the radiance map thus obtained is stored in memory. By reconstructing the radiance map of the image using the camera exposure-pixel response curve, the invention provides a more realistic radiance map than the one obtained by the prior art solutions relying on inverse gamma or standard fixed inverse function.

Figure 3:
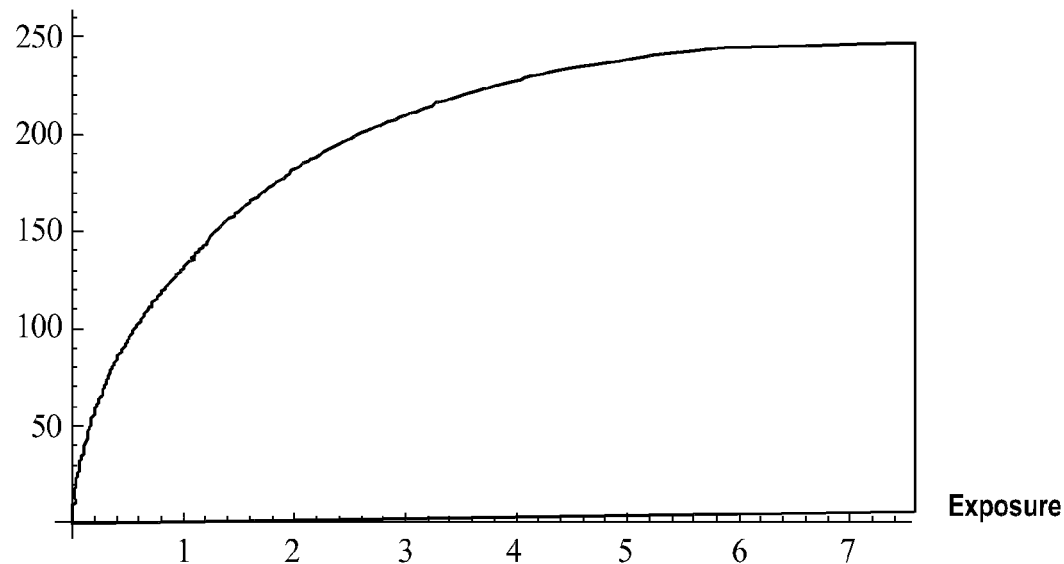
FIG. 3 shows an exemplary camera response curve.

FIG. 3 shows an exemplary camera response curve. The x-axis entitled "Exposure" represents the real-world exposure values, and the y-axis entitled "Pixel Brightness Value" represents the corresponding pixel-radiance values recorded by the camera. "Exposure" is defined as irradiance that the sensor receives multiplied by exposure time. The unit is watt sec per square meter. Pixel-radiance values take integers values from 0 to 255, while exposure values are real numbers.

Figure 4:
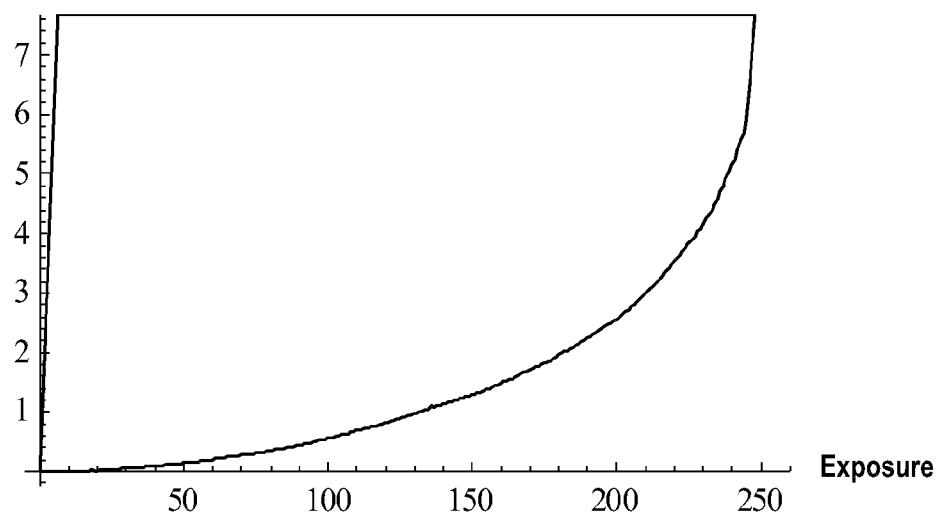
FIG. 4 depicts the inverse response curve obtained from the camera response curve of FIG. 3, in accordance with embodiments of the present invention.

FIG. 4 shows the inverse response curve for the exemplary camera response curve represented in FIG. 2. The x-axis entitled "Pixel Brightness Value" designates the pixel-radiance values and the y-axis entitled "Exposure" designates the corresponding real-world exposure.

The response curve mimics reality as close as possible. At this stage, the radiance array "Radiance[ ]" obtained in step 24 could be combined with the hue array "Hue[ ]" and with the saturation array "Saturation[ ]" to associate them with one image and then convert the image into original image colour space to provide the HDR image. However, the camera curve in itself could generate not enough high dynamic range, and could also introduce quantization artifacts. The second phase of the reverse tone mapping according to the invention compensates for the insufficiency of smooth mapping and for artifacts that could be introduced by the use of camera response curve.

Figure 5:
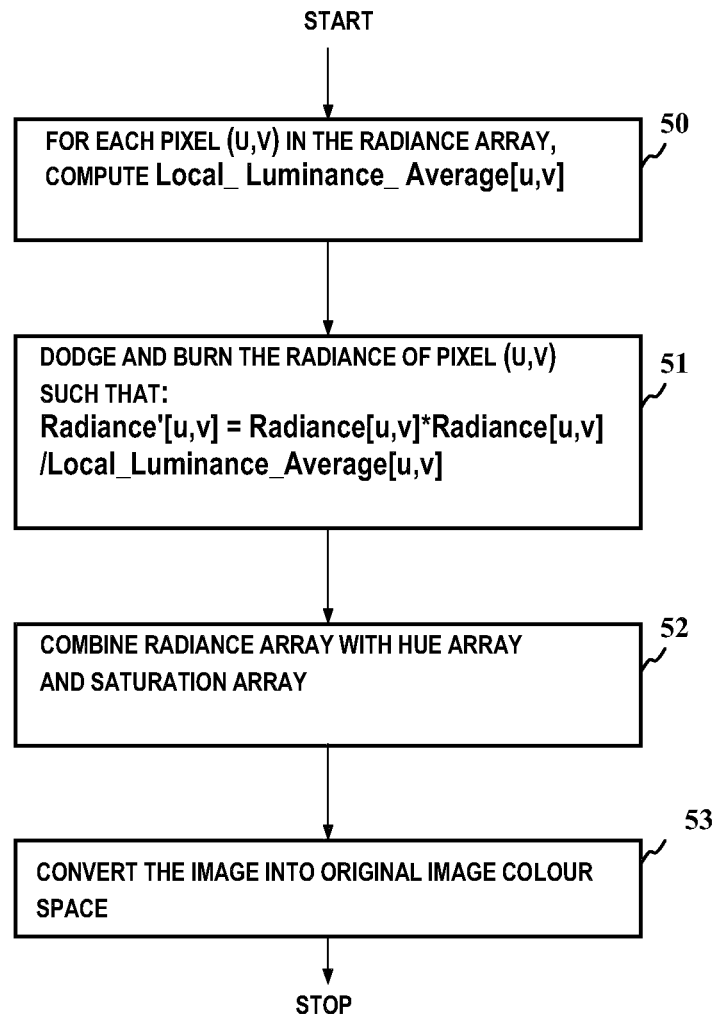
FIG. 5 shows a flowchart describing the Dodging and Burning operation in the HDR domain.

FIG. 5 illustrates the second phase of reverse tone mapping, in accordance with embodiments of the present invention. During this second phase, a dodge and burn like operation to selectively increase the luminance or decrease the luminance of an image, respectively. The "dodge" operation increases the luminance while the "burn" operation decreases the luminance of a pixel. The invention applies a dodging and burning like operation in the HDR domain to extend the dynamic range of an image. For highlights, a dodge operation would further expand the dynamic range for regions with low local contrasts. For shades, a burn operation would further expand the dynamic curse of the left, decreasing the minimum luminance of pixels (which further expands the image dynamic range). This also generally expands the local contrast, thereby allowing for more visible details that are not visible in the LDR image. Moreover, applying a dodging and burning like operation in the HDR domain allows for performing smoothing, thereby decreasing the quantization effects.

In step 50, for each pixel (u,v) in the radiance[ ] array, the local luminance average Local_Luminance_Average[u,v] is computed. The Local Luminance Average at pixel (u, v) may be computed as follows from the approach developed in "Photographic tone reproduction for digital images", ACM Trans. Graph. 21, 3 (July 2002), 267-276, by Reinhard E., Stark M., Shirley P., and Ferwerda J.:

The convolution kernels are set as kernel$_i$[ ]=GaussianKernel (r$_i$)[ ], where r$_i$ is the radius of the GaussianKernel and i designates the local contrast scale index. Values of r$_i$ varies. In a particular embodiment of the invention, this value is set to 1/(2*Sqrt(2))*1.6$^i$. The values of i varies from 0 to 8.

The Local luminance average at pixel (u, v) for value i is computed as Local_Luminance_Average$_i$[u,v]=kernel$_i$ radiance [ ]

Then, the minimum value m of parameter i is calculated such that: Abs(Local_Luminance_Average$_i$[u,v]−Local_Luminance_Average$_{i+1}$[u,v])<ϵ, where ϵ designates the threshold and values of i varies from 0 to 7.

Local_Luminance_Average[u,v] is finally set to LocalLuminanceAverage$_m$[u,v], which provides the local luminance average at pixel (u,v).

In step 51, the luminance of each pixel is adjusted by using the local luminance average Local_Luminance_Average[u,v]. The new radiance value "Radiance'[u,v]" is defined as follows:

Radiance'[u,v]=Radiance[u,v]*Radiance[u,v]/ Local_Luminance_Average[u,v]

According to the invention, this operation is performed in the HDR domain. Indeed, the Applicant has observed that if the pixels surrounding (u,v) are brighter than the origin pixel (u,v), the radiance of the (u,v) pixel is decreased, thereby increasing local contrast. Similarly, it has been observed that if the surrounding pixels are darker than the origin pixel, the radiance of the origin pixel (u,v) will be increased, thereby increasing local contrast. Both decrease and increase of the radiance are determined by the ratio: radiance[u,v]/Local_Luminance_Average[u,v]. This ratio acts as a radiance scaling factor allowing for arbitrary scaling without compression.

This second phase of the reverse tone mapping according to certain embodiments of the invention therefore increases the dynamic range of radiance while enhancing the local contrast of the image through dodging and burning. As such, the invention utilises the photographic concept of dodge/burn to generate a photographic-quality HDR image.

In step 52, the radiance array "Radiance[ ]" is combined with the hue array "Hue[ ]" and with the saturation array "Saturation[ ]" so that they are now associated with one image and then the image is converted into original image colour space in step 53. For using standard library routines (such as the get_RGBtoHSV ( ) in the cimg library cimg.sourceforge.org), the image conversion is calculated using the following equation where Convert( ) converts the image back into original image colour space:

Convert(Hue[ ],Saturation[ ],Radiance[ ]/max(Radiance[ ]))*max(Radiance).

The division part of this equation "Radiance[ ]/max(Radiance[ ]" is used because pixel values are usually normalized so that they may vary from 0 to 1.

Figure 6:
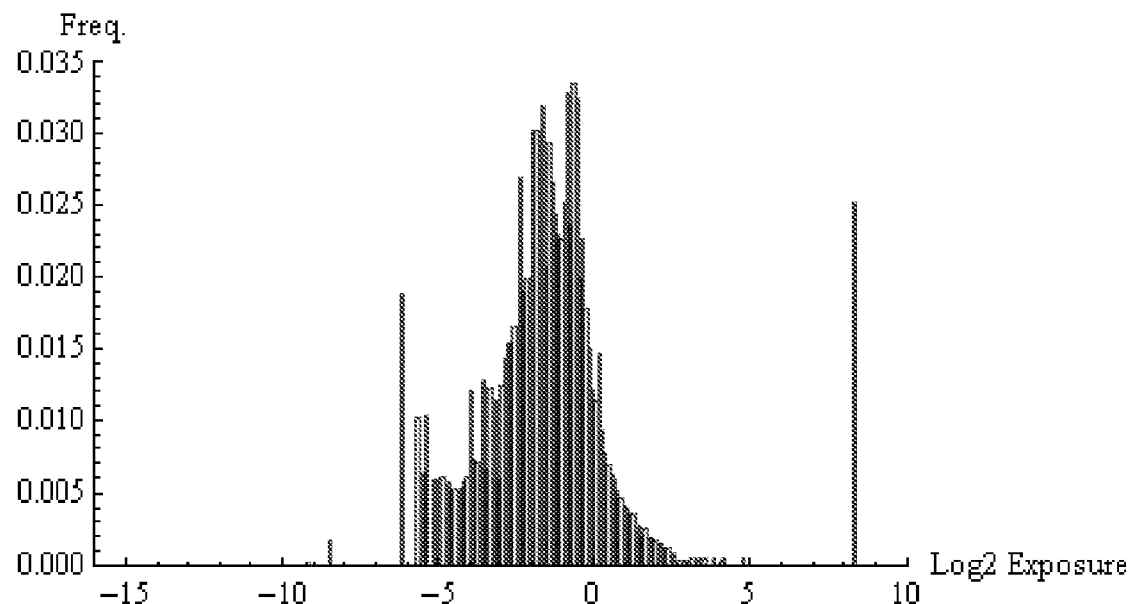
FIG. 6 depicts an exemplary histogram of the initial radiance array for the reverse tone mapping first phase, in accordance with embodiments of the present invention.

FIG. 6 shows an exemplary histogram of the initial radiance array, which is obtained using only the first phase of reverse tone mapping, according to the embodiments of the invention. The radiance array is generated from an input LDR image. The x-axis of the histogram designates the $\log_2$ exposure values and the y-axis designates the frequency of occurrences. As shown, the maximum $\log_2$ exposure is 8.3 and the minimum is −9.38, which gives a dynamic range of 210,381 (five orders of magnitude). This is a typical value in normal real life scenes.

Figure 7:
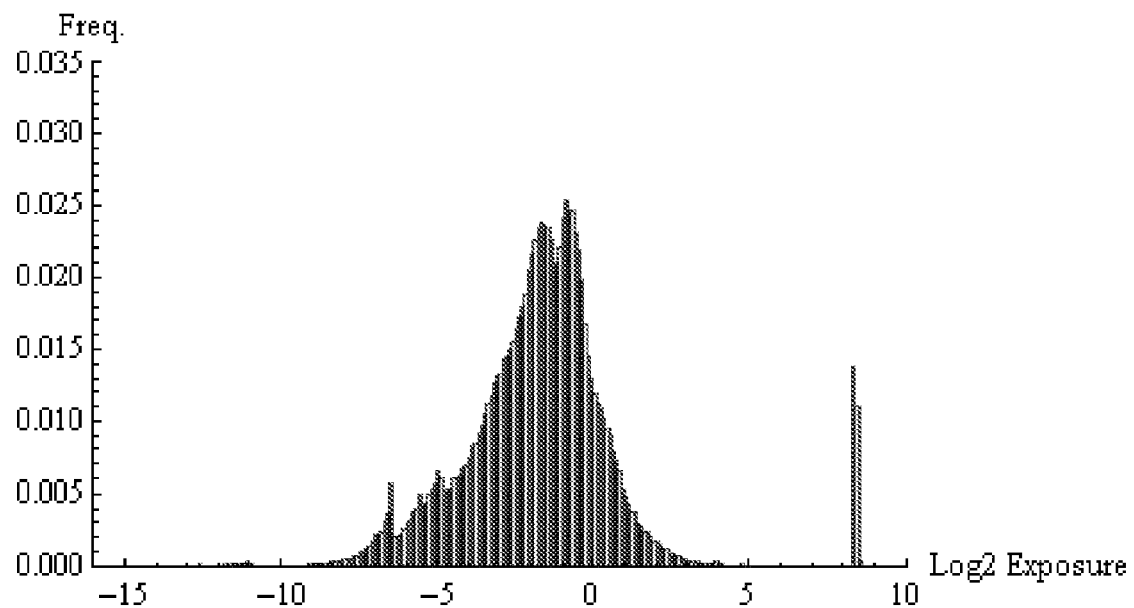
FIG. 7 depicts an exemplary histogram of the initial radiance array for the reverse tone mapping first phase and second phase, in accordance with embodiments of the present invention.

FIG. 7 shows the histogram after the reverse tone mapping second phase according to the embodiments of the invention. The maximum $\log_2$ exposure is now 8.71 and the minimum is −15.52, which gives a dynamic range of $1.98 \times 10^7$. Therefore, the second phase has increased the dynamic range by 2 orders of magnitude. It is also worth noting that the histogram is smoother and wide spread from the both sides, with more emphasis on the shades.

For assessing the quality of the generated HDR image, the MPI HDR (MPI is the acronym for Max Planck Institute informatik) metric may be used. This metric has been defined in the article entitled "Dynamic range independent image quality assessment", *ACM SIGGRAPH* 2008 *Papers* (Los Angeles, Calif., Aug. 11-15, 2008). SIGGRAPH '08. ACM, New York, N.Y., 1-10", by Aydin T. O., Mantiuk R., Myszkowski K., and Seidel H. This image quality metric operates on an image pair where both images have arbitrary dynamic ranges. According to this metric, a summary image is generated with blue, green and red pixels. The colour is determined for each pixel depending on the highest contributor. Blue pixels indicate pixels with contrast improved (not visible on the input image and visible on the output image), green pixels indicate loss of contrast, and red pixels indicate reversal of contrasts. The values of each colour represent the probability of its effect to be visible. The inventors observed that the blue and green parameters of metric appeared to be particularly significant for assessing image quality. Indeed, it appeared that if green is decreased and blue is increased as much as possible, contrast can be improved and visible details are not lost. As a result, an enhancement to image quality assessment is achieved by reporting also the summation of normalized dominate colour for each pixels.

Figure 8:
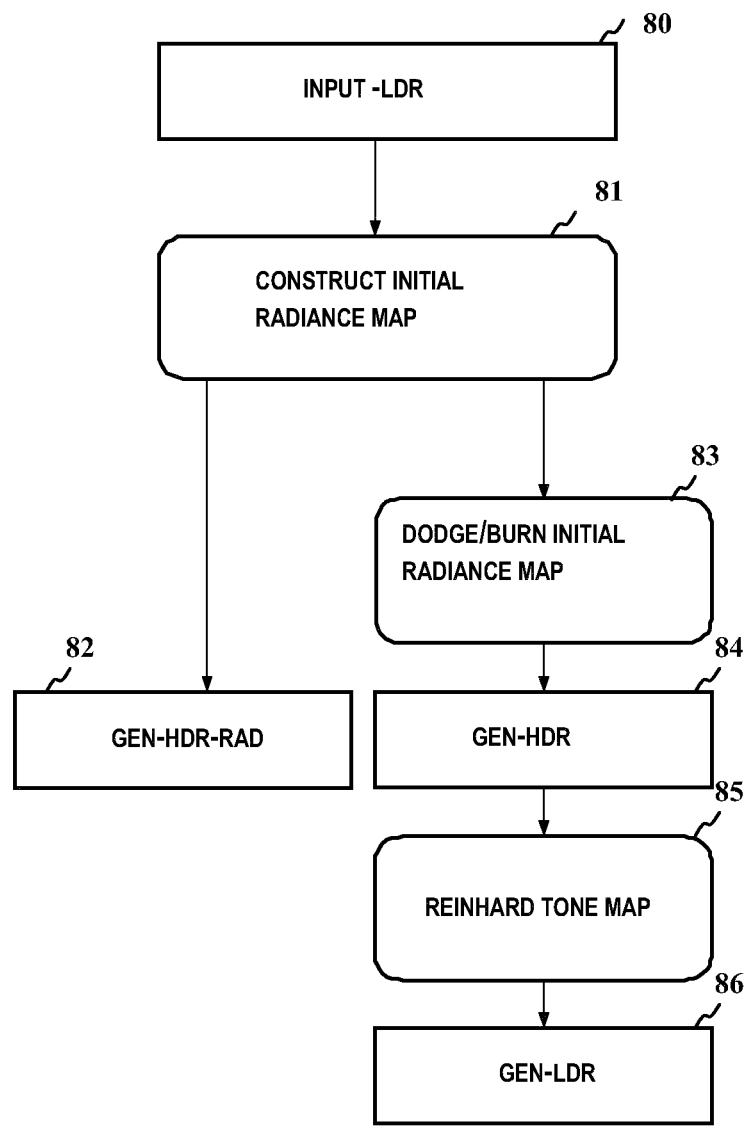
FIG. 8 is a flowchart depicting image generation, in accordance with embodiments of the present invention.

FIG. 8 shows a flowchart illustrating the steps performed to assess the quality of the generated HDR image based on the comparison of a number of images. To facilitate understanding of the following experiments, there follow definitions of certain notations used below to identify images:

1—"Real-HDR" designates an image obtained by using a large sequence of differently exposed images; in other words this is a 'real' HDR image;
2—"Input-LDR" designates an input LDR image;
3—"Gen-HDR" designates the generated HDR image, obtained via reversing the Input-LDR image;
4—"Gen-LDR" designates the tone mapped Gen-HDR image, obtained using the Reinhard et al. photographic tone mapping operator (Erik Reinhard, Michael Stark, Peter Shirley, and James Ferwerda. Photographic tone reproduction for digital images, SIGGRAPH '02: Proceedings of the 29th annual conference on Computer Graphics and Interactive Techniques, pages 267-276, New York, N.Y., USA, 2002. ACM Press);
5—"Gen-HDR-Rad" designates the generated HDR image using only the reverse tone mapping first phase according to the invention.

Figures 9, 10:
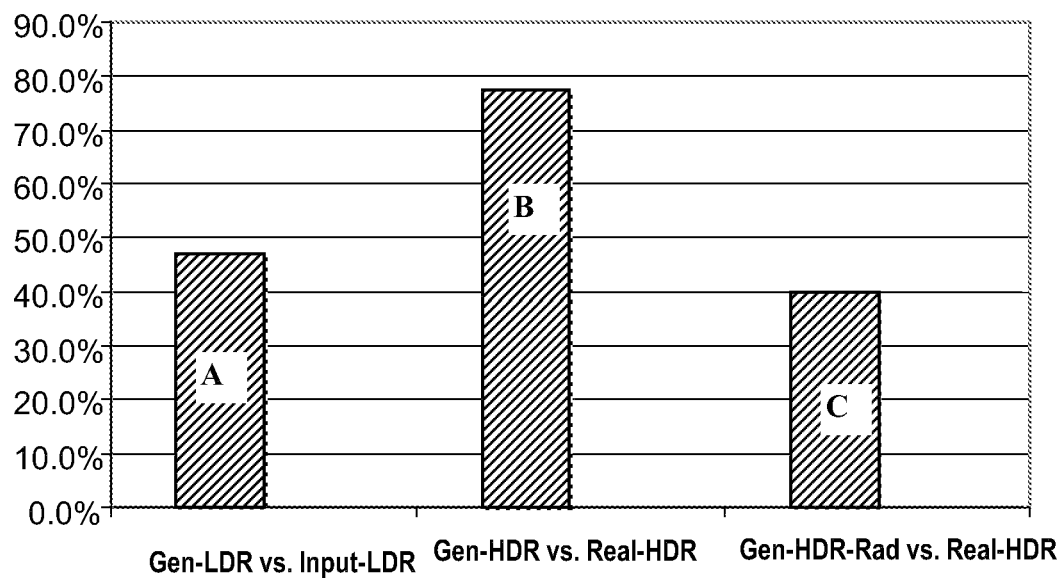
FIG. 9 shows a table indicating exemplary values of the sum of blue/green pixels obtained by comparing images.
FIG. 10 is a diagram representing the values contained in the table of FIG. 8.

The following description of FIG. 8 will be made conjointly with reference to FIGS. 9 and 10 that illustrate the values of the sum of blue/green pixels obtained by comparing images 1-5 defined above. FIG. 9 is a table indicating in the last two columns the blue and green value for each comparison, and FIG. 10 is a diagram representing the per-pixel contrast gain (normalized blue pixels sum) for each comparison. To assess the effect of each reverse tone mapping phase in the quality of the generated HDR image in accordance with the embodiments of invention, step 80 first compares Gen-HDR-Rad and Real-HDR. This first comparison assesses the effect of using the reverse tone mapping first phase according to the invention. The obtained result A is illustrated in FIGS. 9 and 10. This result indicates that there is a significant per-pixel contrast gain of 40.0% and negligible contrast loss of 0.1%.

To assess the effect of using the reverse tone mapping second phase according to the invention, step 81 compares Gen-HDR vs. Real-HDR comparison. The obtained result B, illustrated in FIGS. 9 and 10, shows a per-pixel much considerable improvement in contrast gain of 77.4% and negligible contrast of nearly 0.0%. This indicates that the second phase effectively adds 37% more increase to the contrast gain.

As one of the typical uses of HDR images is enhancing the quality of LDR images, step 82 tests that effect by comparing Gen-LDR and Input-LDR. The obtained result C, represented in FIGS. 9 and 10, shows a considerable improvement in the contrast gain, which is now 47.2%, with no loss in contrast. Accordingly, no detail is lost from the original image when converting into HDR. Moreover, the generated HDR includes details that were not viewable in original image. The later result could potentially help in image enhancement application, e.g. medical image segmentation.

The invention could be applied to a number of image processing applications, such as for example, applications that convert existing LDR video and image libraries into HDR video and image for use with novel HDR displays. The invention can be also applied to LDR image enhancement, where an LDR image is first converted into HDR image, then is applied standard image processing enhancements (such as smoothing, edge detection, etc), before converting back the HDR image into LDR using standard tone mapping techniques (such as Reinhard's tone mapping operator).

The invention accordingly provides an efficient technique for recovering HDR values from a single LDR image.

With the invention, the dynamic range is expanded from both tails of the luminance channel (high and low parts), while the prior art solution expand only the high part. This increases the level of details visible across the middle/shades parts of the image. This further increases the dynamic range of the image than that in the prior art.

Using the exposure-pixel curve of the camera in the reverse tone mapping first phase provides a more realistic radiance map of the image and improves the atheistic quality of the resultant image.

With the invention, new HDR displays can be used for viewing existing LDR images in many applications, such as medical imaging.

Further, the quality of the output of LDR cameras may be improved by using the reverse tone mapping according to the embodiments of the invention to generate a higher quality HDR image that could be forward tone mapped back into LDR, thereby achieving significant improvement in contrast visible. As a result, detection of edges for further image processing operations can be simplified.

The invention has many applications. For example it can be used as an enhancement operation for digital images where further image processing operates better in HDR domains, such as for edge detection in medical imaging.

More generally, the invention can be applied on any digital signal, such as to increase the dynamic range of low quality audio signals.

Figure 11:
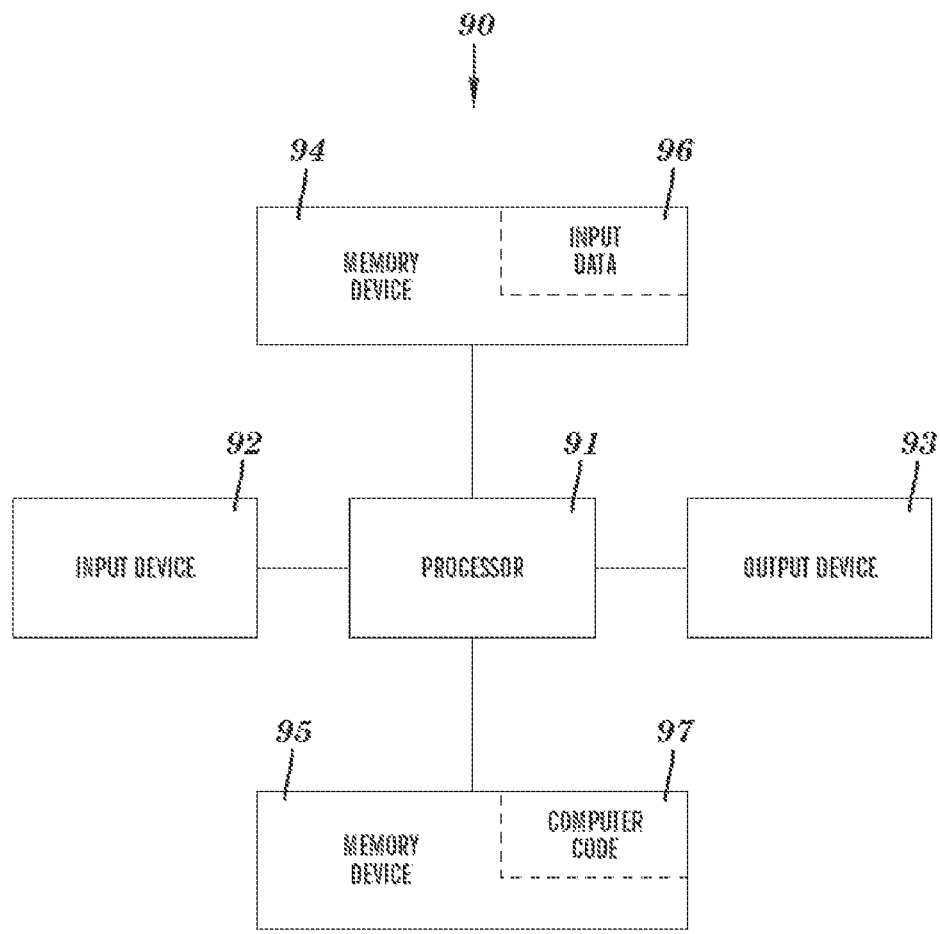
FIG. 11 illustrates a computer system used for transforming an LDR image to an HDR image, in accordance with embodiments of the present invention.

FIG. 11 illustrates a computer system 90 used for transforming a video image from an LDR image to an HDR image, in accordance with embodiments of the present invention. The computer system 90 comprises a processor 91, an input device 92 coupled to the processor 91, an output device 93 coupled to the processor 91, and memory devices 94 and 95 each coupled to the processor 91. The processor 91 is a processing unit such as a central processing unit (CPU). The input device 92 may be, inter alia, a keyboard, a mouse, etc. The output device 93 may be, inter alia, a printer, a plotter, a display device (e.g., a computer screen), a magnetic tape, a removable hard disk, a floppy disk, etc. The display device may comprise the display area 10 of FIG. 1. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for transforming a video image from an LDR image to an HDR image. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 13) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 11 shows the computer system 90 as a particular configuration of hardware and software, any configuration of hardware and software, as would be known to a person of ordinary skill in the art, may be utilized for the purposes stated supra in conjunction with the particular computer system 90 of FIG. 11. For example, the memory devices 94 and 95 may be portions of a single memory device rather than separate memory devices.

While particular embodiments of the present invention have been described herein for purposes of illustration, many modifications and changes will become apparent to those skilled in the art.

The invention claimed is:

1. A method for transforming a digital image from a Low Dynamic Range (LDR) image obtained with a given camera to a High Dynamic Range (HDR) image, comprising:
    obtaining an exposure-pixel response curve for the given camera;
    converting the LDR image to hue, saturation, and brightness (HSB) color space arrays including a hue array, a saturation array, and a brightness array; and
    generating a radiance array by inverse mapping each pixel in the brightness array using an inverse of the exposure-pixel response curve.

2. The method of claim 1, further comprising:
    for each pixel in the radiance array determining a local luminance average;
    generating an adjusted radiance array by adjusting each pixel of the radiance array using the local luminance average for the pixel; and
    converting the LDR image, using the hue array, the saturation array, and the adjusted radiance array, into the HDR image.

3. The method of claim 2, wherein
for each pixel (u,v), the adjusted radiance radiance'[u,v] is computed according to:

$$\text{Radiance'}[u,v]=\text{Radiance}[u,v]*\text{Radiance}[u,v]/\text{Local\_Luminance\_Average}[u,v], \text{ where}$$

Radiance[u,v] designates a radiance value for the pixel (u,v) and
Local_Luminance_Average[u,v] designates the local luminance average at the pixel (u,v).

4. The method of claim 2, wherein
the local luminance average is determined from i convolution kernels defined as:

$$\text{kernel}_i[\ ]=\text{GaussianKernel}(r_i)[\ ], \text{ where}$$

$r_i$ is a radius of a GaussianKernel and,
i designates a local contrast scale index varying from 0 to 8.

5. The method of claim 4, wherein
$r_i$ is $1/(2*\text{Sqrt}(2))*1.6^i$.

6. The method of claim 1, wherein
the LDR image is converted according to:

$$\text{Convert}(\text{Hue}[\ ],\text{Saturation}[\ ],\text{Radiance}[\ ]/\max(\text{Radiance}[\ ]))*\max(\text{Radiance}), \text{ where}$$

Hue[ ] designates the hue array,
Saturation[ ] the saturation array, and
Radiance[ ] the radiance array.

7. The method of claim 1, wherein
the exposure-pixel response curve is obtained from a camera data sheet of the given camera.

8. The method of claim 1, wherein
the exposure-pixel response curve is obtained using a sequence of differently exposed images from the given camera and for a same screen.

9. A computer hardware system configured to transforms a digital image from a Low Dynamic Range (LDR) image obtained with a given camera to a High Dynamic Range (HDR) image, comprising:
a processor, wherein the processor is configured to perform
obtaining an exposure-pixel response curve for the given camera;
converting the LDR image to hue, saturation, and brightness (HSB) color space arrays including a hue array, a saturation array, and a brightness array; and
generating a radiance array by inverse mapping each pixel in the brightness array using an inverse of the exposure-pixel response curve.

10. The computer hardware system of claim 9, wherein the processor is further configured to perform
for each pixel in the radiance array determining a local luminance average;
generating an adjusted radiance array by adjusting each pixel of the radiance array using the local luminance average for the pixel; and
converting the LDR image, using the hue array, the saturation array, and the adjusted radiance array, into the HDR image.

11. The computer hardware system of claim 10, wherein
for each pixel (u,v), the adjusted radiance radiance'[u,v] is computed according to:

$$Radiance'[u,v]=Radiance[u,v]*Radiance[u,v]/Local\_Luminance\_Average[u,v], \text{ where}$$

Radiance[u,v] designates a radiance value for the pixel (u,v) and
Local_Luminance_Average[u,v] designates the local luminance average at the pixel (u,v).

12. The computer hardware system of claim 10, wherein
the local luminance average is determined from i convolution kernels defined as:

$$kernel_i[\ ]=GaussianKernel(r_i)[\ ], \text{where}$$

$r_i$ is a radius of a GaussianKernel and,
i designates a local contrast scale index varying from 0 to 8.

13. The computer hardware system of claim 12, wherein $r_i$ is $1/(2*Sqrt(2))*1.6^i$.

14. The computer hardware system of claim 9, wherein the LDR image is converted according to:

$$Convert(Hue[\ ],Saturation[\ ],Radiance[\ ]/max(Radiance[\ ]))*max(Radiance), \text{ where}$$

Hue[ ] designates the hue array,
Saturation[ ] the saturation array, and
Radiance[ ] the radiance array.

15. A computer program product comprising a computer usable storage medium having stored therein computer usable program code for transforming a digital image from a Low Dynamic Range (LDR) image obtained with a given camera to a High Dynamic Range (HDR) image, the computer usable program code, which when executed by a computer hardware system, causes the computer hardware system to perform:
obtaining an exposure-pixel response curve for the given camera;
converting the LDR image to hue, saturation, and brightness (HSB) color space arrays including a hue array, a saturation array, and a brightness array; and
generating a radiance array by inverse mapping each pixel in the brightness array using an inverse of the exposure-pixel response curve, wherein
the computer usable storage medium is not a transitory, propagating signal per se.

16. The computer program product of claim 15, further comprising:
for each pixel in the radiance array determining a local luminance average;
generating an adjusted radiance array by adjusting each pixel of the radiance array using the local luminance average for the pixel; and
converting the LDR image, using the hue array, the saturation array, and the adjusted radiance array, into the HDR image.

17. The computer program product of claim 16, wherein
for each pixel (u,v), the adjusted radiance radiance'[u,v] is computed according to:

$$Radiance'[u,v]=Radiance[u,v]*Radiance[u,v]/Local\_Luminance\_Average[u,v], \text{ where}$$

Radiance[u,v] designates a radiance value for the pixel (u,v) and
Local_Luminance_Average[u,v] designates the local luminance average at the pixel (u,v).

18. The computer program product of claim 16, wherein
the local luminance average is determined from i convolution kernels defined as:

$$kernel_i[\ ]=GaussianKernel(r_i)[\ ], \text{where}$$

$r_i$ is a radius of a GaussianKernel and,
i designates a local contrast scale index varying from 0 to 8.

19. The computer program product of claim 18, wherein $r_i$ is $1/(2*Sqrt(2))*1.6^i$.

20. The computer program product of claim 15, wherein the LDR image is converted according to:

$$Convert(Hue[\ ],Saturation[\ ],Radiance[\ ]/max(Radiance[\ ]))*max(Radiance), \text{ where}$$

Hue[ ] designates the hue array,
Saturation[ ] the saturation array, and
Radiance[ ] the radiance array.

* * * * *